US005743352A

United States Patent [19]
Miller et al.

[11] Patent Number: 5,743,352
[45] Date of Patent: Apr. 28, 1998

[54] ELECTRICALLY-ACTUATED POWER STEERING SYSTEM

[75] Inventors: John Michael Miller, Saline; Robert Howard Erickson, Novi, both of Mich.

[73] Assignee: Ford Global Technologies, Inc., Dearborn, Mich.

[21] Appl. No.: 707,258

[22] Filed: Sep. 3, 1996

[51] Int. Cl.$^6$ ........................................... B62D 5/04
[52] U.S. Cl. ........................................... 180/446
[58] Field of Search ........................... 180/443, 444, 180/445, 446; 318/798, 801, 802, 803

[56] References Cited

U.S. PATENT DOCUMENTS

| | | | |
|---|---|---|---|
| 4,753,309 | 6/1988 | Marumoto et al. | 180/446 |
| 4,865,148 | 9/1989 | Marumoto et al. | 180/446 |
| 4,875,539 | 10/1989 | Abukawa et al. | 180/446 |
| 4,960,178 | 10/1990 | Abukawa et al. | 180/443 |
| 5,033,565 | 7/1991 | Abukawa et al. | 180/443 |
| 5,096,011 | 3/1992 | Oslapas | 180/412 |
| 5,171,173 | 12/1992 | Henderson et al. | 440/7 |
| 5,194,794 | 3/1993 | Shamoto | 180/446 |
| 5,257,828 | 11/1993 | Miller et al. | 180/446 |
| 5,361,210 | 11/1994 | Fu | 180/446 |
| 5,473,231 | 12/1995 | McLaughlin et al. | 180/446 |
| 5,475,289 | 12/1995 | McLaughlin et al. | 180/446 |

Primary Examiner—Kevin Hurley
Attorney, Agent, or Firm—Mark S. Sparschu

[57] ABSTRACT

In one embodiment of the present invention, an electric assist power steering system includes steerable wheels and a polyphase induction motor mechanically coupled to provide assistance in steering the wheels. Additionally, the system includes a DC power source such as a vehicle battery or an alternator. The system also includes an inverter to convert the output voltage of the DC power source into AC phase voltages for the induction motor, the AC phase voltages having line-to-line amplitudes less than or equal to the output voltage of the DC power source. Another embodiment of the present invention includes an induction motor designed to have rotor back iron thinner than stator back iron. Such a motor will have a rotor of reduced diameter, minimizing the rotational inertia of the rotor. The present invention enables a practical electric assisted power steering system and the numerous advantages derived from an electric assisted system.

14 Claims, 2 Drawing Sheets

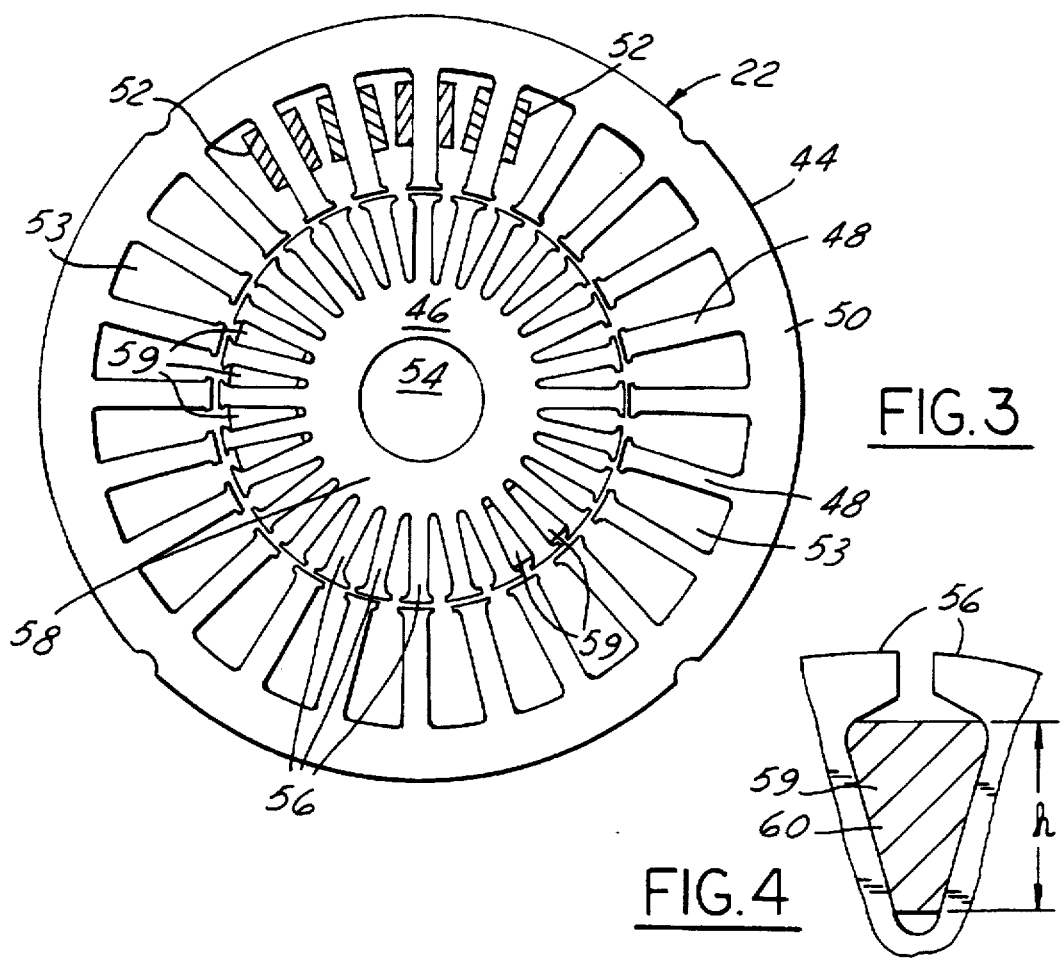
FIG.3
FIG.4
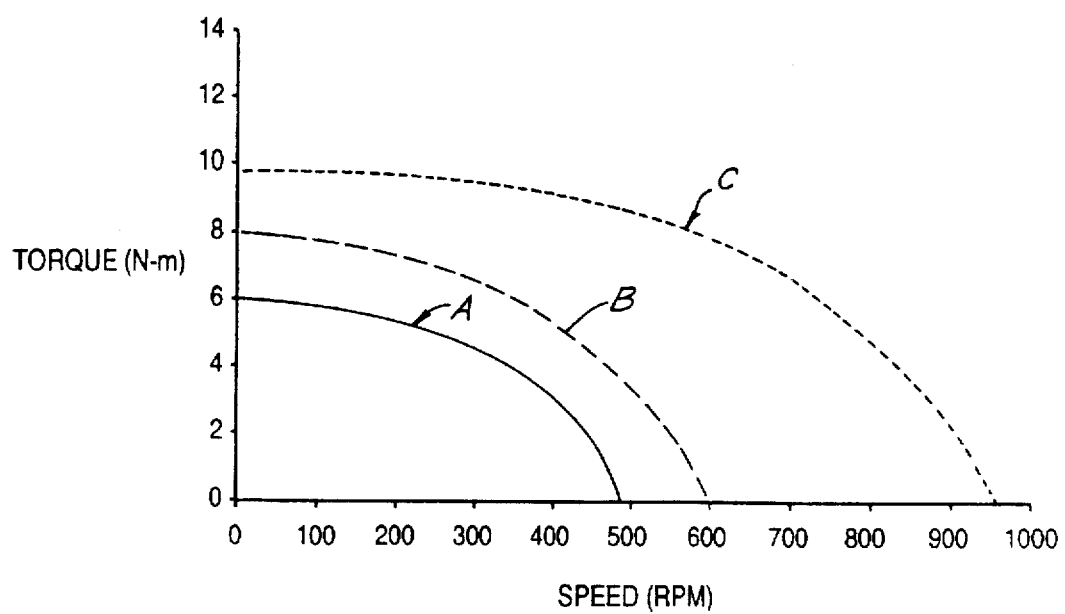
FIG.5

ELECTRICALLY-ACTUATED POWER STEERING SYSTEM

BACKGROUND OF THE INVENTION

1. Field of the Invention

The present invention relates to power assist systems for motor vehicle steering.

2. Description of the Related Art

Several advantages can be obtained by replacing the traditional hydraulic power assist steering systems in motor vehicles with electrically-actuated power assist steering systems. One such advantage is in engine compartment packaging. Space available in the front-end accessory drive area of a vehicle's engine is typically very scarce, particularly with the large number of accessories which compete for that space. Such accessories may include an alternator, a cooling fan, an air conditioning compressor and a power steering pump, among others. Removing the power steering pump from the front end accessory drive to another location can thus provide packaging advantages.

Another advantage which an electrically-actuated power assist steering system can provide is improved fuel economy. A traditional power steering pump places a mechanical load on the vehicle's engine whenever the engine is running, regardless of whether power assist is required at any particular moment. This represents a waste of energy. An electric motor by contrast can be controlled to consume energy only when power assist is needed.

Several electric power assist steering systems have been proposed. One such system is disclosed in U.S. Pat. No. 5,473,231, issued to McLaughlin et al. The system of the '231 patent includes a switched reluctance motor to provide electric power steering assist. Another electric assist system is disclosed in U.S. Pat. No. 5,194,794, issued to Shamoto. The system of the '794 patent uses a brushless DC motor to provide steering assist. Although these two systems may be generally effective, they have shortcomings. Without mechanical and/or electrical compensation, a switched reluctance motor generates significant torque ripple. Such torque ripple, which would be felt by the vehicle's driver through the steering wheel, is undesirable. Further, brushless DC motors are a very expensive solution with which to provide electric steering assist.

Therefore, a system which can provide the advantages of an electrically-actuated power steering system without the drawbacks of the various proposed electrically-actuated power steering systems will provide advantages over the prior art.

SUMMARY OF THE INVENTION

The present invention provides an electric power assist steering system for a motor vehicle. The system comprises steerable wheels and a polyphase induction motor mechanically coupled to provide assistance in steering the steerable wheels. Additionally, the system comprises a vehicle battery having a DC voltage. Further; the system includes an inverter electrically coupled to the vehicle battery and to the induction motor and adapted to convert the DC voltage to AC phase voltages having line-to-line amplitudes less than or equal to the DC voltage.

The present invention further provides a second electric power assist steering system for a motor vehicle. The system includes steerable wheels and a polyphase induction motor mechanically coupled to provide assistance in steering the steerable wheels. Also, the system comprises a power source having a DC output voltage with a nominal value of about 12 volts DC and conversion means electrically coupled to the power source and to the induction motor for converting the DC output voltage to AC phase voltages having line-to-line amplitudes less than or equal to the DC voltage.

The present invention additionally provides an induction motor comprising a rotor further comprising a shaft defining an axis of rotation of the rotor, back iron disposed about the shaft and having a thickness, and a plurality of radially-extending teeth extending from the back iron. The motor further contains a stator wound to have at least four poles, the stator comprising back iron having a thickness and a plurality of radially-extending teeth extending from the back iron and opposing the teeth of the rotor. In the motor; the thickness of the back iron of the rotor is less than the thickness of the back iron of the stator.

Power assist steering systems according to the present invention can provide smooth steering assist torque in a cost-efficient system. By enabling a practical electric assist power steering system, the present invention provides advantages over the prior art.

BRIEF DESCRIPTION OF THE DRAWINGS

FIG. 3 is a cross-sectional end view of motor 22 of FIG. 1.

FIG. 4 is an enlarged view of a portion of the rotor of motor 22.

FIG. 5 is a graph which illustrates several torque-speed curves for motor 22 under various frequency and voltage conditions.

DETAILED DESCRIPTION OF THE PREFERRED EMBODIMENT

Figure 1:
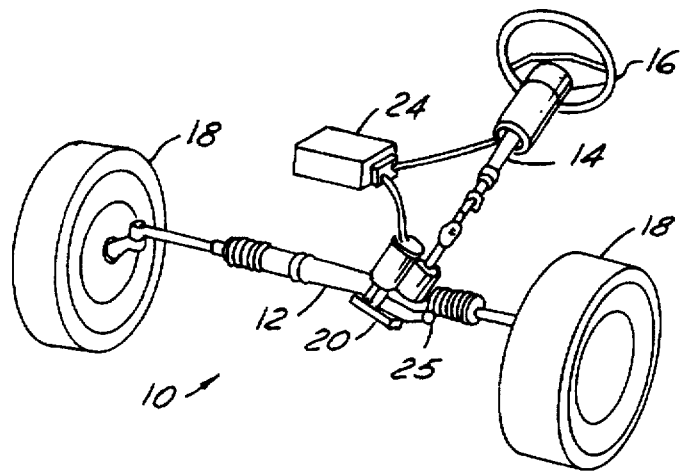
FIG. 1 is an illustration of an electrically-actuated power steering system 10 according to one embodiment of the present invention.

Referring first to FIG. 1, an electrically-actuated power assist system (EAPS) 10 for a motor vehicle according to one embodiment of the present invention is illustrated. System 10 includes a steering gear 12, coupled to which are a steering column 14 and steering wheel 16. Steering gear 12 is coupled to steerable wheels 18, typically the front wheels of the vehicle. Also coupled to steering gear 12 via suitable gearing 20 is an electric motor 22. Electric motor 22 is an induction motor, preferably a four-pole, three-phase induction motor. Sinusoidally-wound and sinusoidally-excited induction motors inherently provide torque with very low ripple. An electronic control module 24 is coupled to control electric motor 22. A torque sensor 25 is also provided to sense the torque experienced by a driver operating steering wheel 16 to steer wheels 18.

Figure 2:
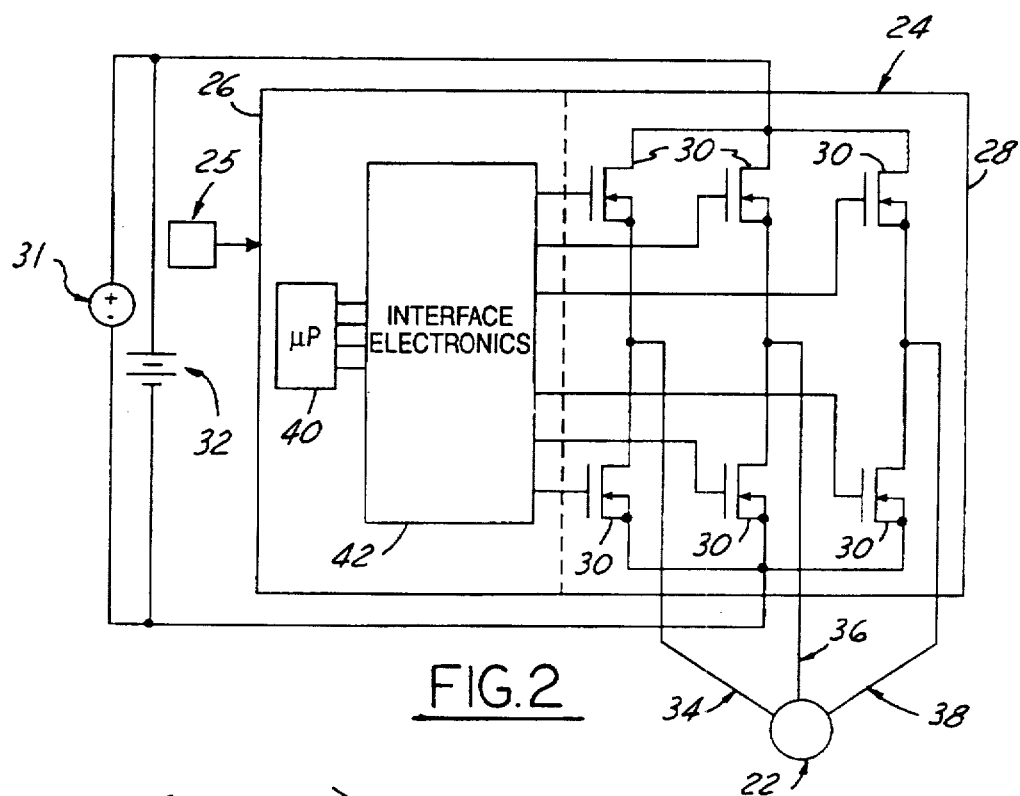
FIG. 2 is an electrical block diagram of system 10 of FIG. 1.

Refer now additionally to FIG. 2. FIG. 2 shows an electrical block diagram of system 10. Electronic control module 24 includes an inverter portion 26 and a control portion 28. Inverter portion 26 includes six semiconductor switches 30. Switches 30 are coupled across the vehicle's alternator 31 and 12-volt battery 32 so as to be able to generate three-phase AC voltages on phases 34, 36 and 38 of motor 22.

Control portion 28 includes the control electronics to control motor 22. Control portion 28 comprises a microprocessor or microcontroller 40 having sufficient microcomputer resources (inputs, outputs, throughput, memory and the like) to perform the functions ascribed to it herein. Interface electronics 42 scale, buffer and otherwise convert the signals from microprocessor 40 so as to be electrically compatible to drive the gates of switches 30.

Torque sensor 25 is also an input to electronic control module 24. Using the signal from torque sensor 25 as a reference, electronic control module 24 controls the torque of motor 22 so that the vehicle's driver experiences a predetermined amount of torque as he/she turns the steering wheel. Electronic control module 24 can control the torque of motor 22 by any known method of induction motor torque control, such as direct or indirect field-oriented control or scalar control. Of course, appropriate inputs to control portion 26 for the motor control method selected, such as phase currents and shaft position of motor 22, must be provided.

Other sensors can also provide inputs to electronic control module 24 to further customize the control of motor 22. For example, a steering wheel position sensor can sense the rotational position of steering wheel 16. Steering assist torque can be controlled to be a function of steering wheel rotational position. Also, a vehicle speed signal can be provided, so that steering assist torque can be controlled as a function of vehicle speed.

One will recognize by looking at FIG. 2 that the line-to-line output voltage of inverter portion 28 to induction motor 22 will always be less than or equal to the voltage of battery 32, nominally 12 volts. That is, no voltage-boosting means are provided to generate a higher voltage.

The frequency of the line voltages provided by inverter portion 28 will preferably be less than or equal to about 32 hz. For a four-pole motor at an electrical frequency of 32 hz, the motor's synchronous speed will be 960 revolutions per minute. This should easily be an upper bound of the speed required for an EAPS system. The required speed of the motor is defined by the speed at which the vehicle's driver can turn the steering wheel, reflected through gearing 20. In one embodiment of the present invention, gearing 20 was selected to have a ratio of about 7:1 (i.e., motor 22 turns at about seven times the speed of steering gear 12).

Refer now additionally to FIG. 3, where a cross-sectional end view of motor 22 is provided. Motor 22 includes a stator 44 and a rotor 46. Stator 44 is preferably made of laminated steel and further comprises teeth 48 and back iron 50. Wound about teeth 48 are three-phase windings 52, four of which are illustrated in FIG. 3. Windings 52 are preferably parallel-connected, owing to the relatively low voltage (less than or about 12 volts) at which motor 22 operates. Between teeth 48 are slots 53.

Rotor 46 further includes steel laminations having the cross section illustrated in FIG. 3, mounted on a solid steel shaft 54. The cross-sectional view of FIG. 3 shows that the laminated portion of rotor 46 has teeth 56 and back iron 58. Between each pair of adjacent teeth 56 is a slot 59.

Refer also to FIG. 4. Mounted within each slot 59 between teeth 56 of rotor 46 is a conductor bar 60, as is common in induction motors. Bars 60 are preferably composed of an aluminum alloy (such as, for example 6063 or 6101) having considerably higher resistivity than copper. Such an alloy has the advantage of greater mechanical strength than copper. Also, since skin depth is a function of the square root of resistivity, the skin depth of conductor bars 60 will be greater than that of copper. Preferably, the skin depth is about one-half the height "h" of bars 60, so currents induced in bars 60 will be distributed throughout bars 60. Thus, heating of rotor 60 will be minimized. Bars 60 are coupled by end rings (not shown) which, along with bars 60, must have sufficient area to conduct the rotor currents involved, as is the case in any caged-rotor induction motor.

One principal parameter which is important to minimize in the design of a motor for an EAPS application is rotational inertia of rotor 46. Minimizing the inertia both reduces the tendency for motor 22 to depart from the typical "feel" of a power assist steering system and allows motor 22 to react quickly to control changes commanded by electronic control module 24.

One way to reduce the inertia of rotor 46 is to reduce its diameter. This can be done by allowing a significant amount of rotor flux in shaft 54. Typically, flux in shaft 54 would be avoided, to avoid joule heating of shaft 54 due to eddy currents induced by the flux during slip. Avoiding flux in shaft 54 would require that the back iron 58 of rotor 46 be rather thick, in order to provide a path for essentially all of the rotor flux. The relatively thick back iron would translate to a relatively large-diameter rotor 46, hence higher rotational inertia. However, at the relatively low slip frequencies involved here (at most 32 hz at motor startup or stall), joule heating is not a significant concern. Thus, back iron 58 of rotor 46 can be designed relatively thin, in order to allow shaft 54 to contain a significant amount of rotor flux. Reducing the thickness of rotor back iron 58 to be less than the thickness of stator back iron 50 will result in a significant amount of rotor flux being carried in shaft 54. This is because most of the flux in stator back iron 50 passes through teeth 48 of stator 44, teeth 56, back iron 58 and shaft 54 of rotor 46. With back iron 58 of rotor 46 being thinner (and therefore also smaller in cross-sectional area) than back iron 50 of stator 44, significant rotor flux will exist in shaft 54.

Several features of the design of motor 22 should be highlighted. As was noted, the resistance of rotor bars 60 is relatively high. Further, slots 59 in which rotor bars 60 reside are open to stator 44. This reduces the leakage inductance of rotor 46. Also, teeth 56 of rotor 46 are parallel-sided, allowing for high rotor flux and consequently low leakage inductance. More typically, teeth 56 of rotor 46 would narrow as they approached the center of rotor 46. It will also be noted that rotor 46 has deep bars. The deep bars, it was noted above, allow rotor currents to be distributed across a large area, reducing rotor heating. The deep bars also provide a rotor leakage reactance which has a particularly large increase with increasing slip frequency. Also, rotor 46 and stator 44 are designed with as small an air gap therebetween as possible. This results in low leakage inductance of motor 22 and maximum magnetizing inductance.

The results of the above design features of motor 22 are that maximum torque of motor 22 occurs at high slip, due principally to the high-resistance, low-leakage, deep-bar design. Also, the low-leakage design allows motor 22 to have a relatively large maximum torque. For one motor 22 which was tested, the torque-speed curve is illustrated in FIG. 5. Curve "A" of FIG. 5 was measured at an electrical frequency of 16 hertz and a voltage of 4.0 volts; curve "B" was measured at 20 hertz and 5.3 volts; and curve "C" was measured at 32 hertz and 8.0 volts. It can be seen that the maximum torque in each case is at or near zero rotor speed. This feature is advantageous due to the greatest steering assist torque typically being needed where the vehicle driver's rotation of steering wheel 16 is the slowest (e.g., in a parking lot, for example).

Figure 6:
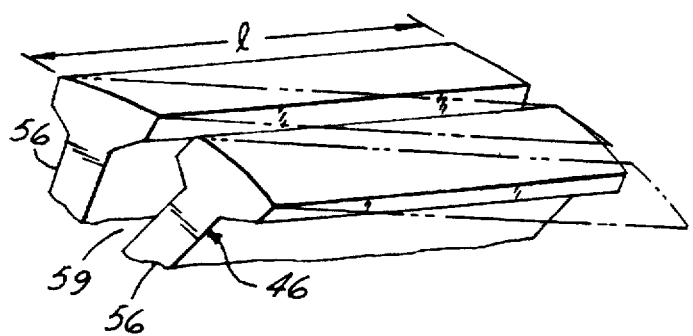
FIG. 6 is an illustration of an alternative design for rotor 46 of motor 22.

Refer additionally to FIG. 6, where a design alternative for rotor 46 is illustrated. As shown in phantom in FIG. 6, the teeth 56 and slots 59 of rotor 46 can be skewed. Such skewing may be about three-fourths of the pitch of stator slots 53 over the length "1" of rotor 46. The skewing helps to further minimize the very small torque ripple which may exist in induction motor 22, by making less abrupt the magnetic interaction between slots 59 of rotor 46 and slots 53 of stator 44 as slots 59 of rotor 46 pass slots 53 of stator 44.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. An electric power assist steering system for a motor vehicle, said system comprising:
   (a) steerable wheels;
   (b) a polyphase induction motor mechanically coupled to provide assistance in steering said steerable wheels;
   (c) a vehicle battery having a DC voltage; and
   (d) an inverter electrically coupled to said vehicle battery and to said induction motor and adapted to convert said DC voltage to AC phase voltages having line-to-line amplitudes less than or equal to said DC voltage.

2. An electric power assist steering system as recited in claim 1, wherein said DC voltage is about 12 volts.

3. An electric power assist steering system as recited in claim 2, wherein said AC phase voltages are at frequencies less than or equal to about 32 hertz.

4. An electric power assist steering system as recited in claim 2, wherein said induction motor further comprises:
   a rotor further comprising a shaft defining an axis of rotation of said rotor, back iron disposed about said shaft and having a thickness, and a plurality of radially-extending teeth extending from said back iron; and
   a stator coaxially disposed across an air gap about said rotor, said stator comprising back iron having a thickness and a plurality of radially-extending teeth extending from said back iron and opposing said teeth of said rotor;
   wherein said thickness of said back iron of said rotor is less than said thickness of said back iron of said stator.

5. An electric power assist steering system as recited in claim 4, wherein said induction motor has four or more stator poles.

6. An electric power assist steering system as recited in claim 3, wherein said induction motor further comprises:
   a rotor further comprising a shaft defining an axis of rotation of said rotor, back iron disposed about said shaft and having a thickness, and a plurality of radially-extending teeth extending from said back iron; and
   a stator coaxially disposed about said rotor, said stator comprising back iron having a thickness and a plurality of radially-extending teeth extending from said back iron and opposing said teeth of said rotor;
   wherein said thickness of said back iron of said rotor is less than said thickness of said back iron of said stator.

7. An electric power assist steering system as recited in claim 6, wherein said induction motor has four or more stator poles.

8. An electric power assist steering system as recited in claim 4, wherein:
   said rotor teeth each have a radially-outward top opposite said stator and radially-extending parallel sides between said top and said rotor back iron; and
   each adjacent pair of rotor teeth define an open slot therebetween, each slot containing a conductive bar made of an aluminum alloy.

9. An electric power assist steering system as recited in claim 4, wherein said teeth of said rotor are skewed with respect to said axis of rotation.

10. An electric power assist steering system for a motor vehicle, said system comprising:
    (a) steerable wheels;
    (b) a polyphase induction motor mechanically coupled to provide assistance in steering said steerable wheels;
    (c) a power source having a DC output voltage with a nominal value of about 12 volts DC; and
    (d) converter means electrically coupled to said power source and to said induction motor for converting said DC output voltage to AC phase voltages having line-to-line amplitudes less than or equal to said DC voltage.

11. An electric power assist steering system as recited in claim 10, wherein said induction motor further comprises:
    a rotor further comprising a shaft defining an axis of rotation of said rotor, back iron disposed about said shaft and having a thickness, and a plurality of radially-extending teeth extending from said back iron; and
    a stator coaxially disposed across an air gap about said rotor, said stator comprising back iron having a thickness and a plurality of radially-extending teeth extending from said back iron and opposing said teeth of said rotor;
    wherein said thickness of said back iron of said rotor is less than said thickness of said back iron of said stator.

12. An electric power assist steering system as recited in claim 11, wherein said induction motor has four or more stator poles.

13. An electric power assist steering system as recited in claim 12, wherein:
    said rotor teeth each have a radially-outward top opposite said stator and radially-extending parallel sides between said top and said rotor back iron; and
    each adjacent pair of rotor teeth define an open slot therebetween, each slot containing a conductive bar made of an aluminum alloy.

14. An electric power assist steering system as recited in claim 13, wherein said teeth of said rotor are skewed with respect to said axis of rotation.

* * * * *